United States Patent [19]

Baboff et al.

[11] 4,115,172
[45] Sep. 19, 1978

[54] APPARATUS AND METHOD FOR APPLYING PUNCTURE SEALANT MATERIAL TO A TIRE

[75] Inventors: Leon Ian Baboff, Bethany; Daniel Shichman, Trumbull; Lawrence Paul Reed, Newtown, all of Conn.

[73] Assignee: Uniroyal, Inc., New York, N.Y.

[21] Appl. No.: 784,477

[22] Filed: Apr. 4, 1977

[51] Int. Cl.$^2$ ............................................. B60C 21/08
[52] U.S. Cl. ..................... 156/115; 118/202; 118/215; 118/232; 118/318; 152/347; 156/500; 156/244.13; 264/216; 425/460; 427/231; 428/912
[58] Field of Search ............... 156/75, 115, 123 R, 156/110 R, 242, 244, 394, 500, 501; 427/230, 231; 118/73, 200, 202, 214, 215, 232, 254, 317, 318; 264/209, 214, 216; 425/97, 90, 376 R, 460; 152/346–349; 428/912

[56] References Cited

U.S. PATENT DOCUMENTS

| | | | |
|---|---|---|---|
| 1,474,654 | 11/1923 | Urbach | 118/318 |
| 2,173,738 | 9/1939 | Urquhart et al. | 118/317 |
| 2,736,921 | 3/1956 | Mulbarger et al. | 264/209 |
| 3,099,371 | 7/1963 | Meader | 222/414 |
| 3,825,965 | 7/1974 | Root et al. | 118/73 |
| 3,881,537 | 5/1975 | Miyazato | 152/347 |
| 3,935,893 | 2/1976 | Stany et al. | 152/347 |
| 3,952,787 | 4/1976 | Okado et al. | 152/347 |
| 3,962,987 | 6/1976 | Brandl | 118/318 |
| 3,981,342 | 9/1976 | Farber et al. | 152/347 |
| 3,987,833 | 10/1976 | Powell et al. | 156/75 |

*Primary Examiner*—John E. Kittle
*Attorney, Agent, or Firm*—Philip Rodman

[57] ABSTRACT

An uninflated unmounted tire is supported in a frame of the apparatus for engagement with a sealant applicator head that contacts the interior tire liner after a bead spreading device on the frame spreads apart the tire beads, and an elevator member on the frame raises the tire. The applicator head has a tire engaging profile corresponding to that of the tire and an elongated opening for which highly viscous, sticky sealant is discharged onto the tire liner under the tread in a layer of predetermined cross section as the tire is rotated on the frame past the applicator head. A complete coating of sealant is applied during one revolution of the tire, with the sealant having a butt joint, or an overlapping splice formed when the elevator member is lowered a predetermined amount by a drop-off mechanism as the tire completes one revolution of sealant application.

22 Claims, 26 Drawing Figures

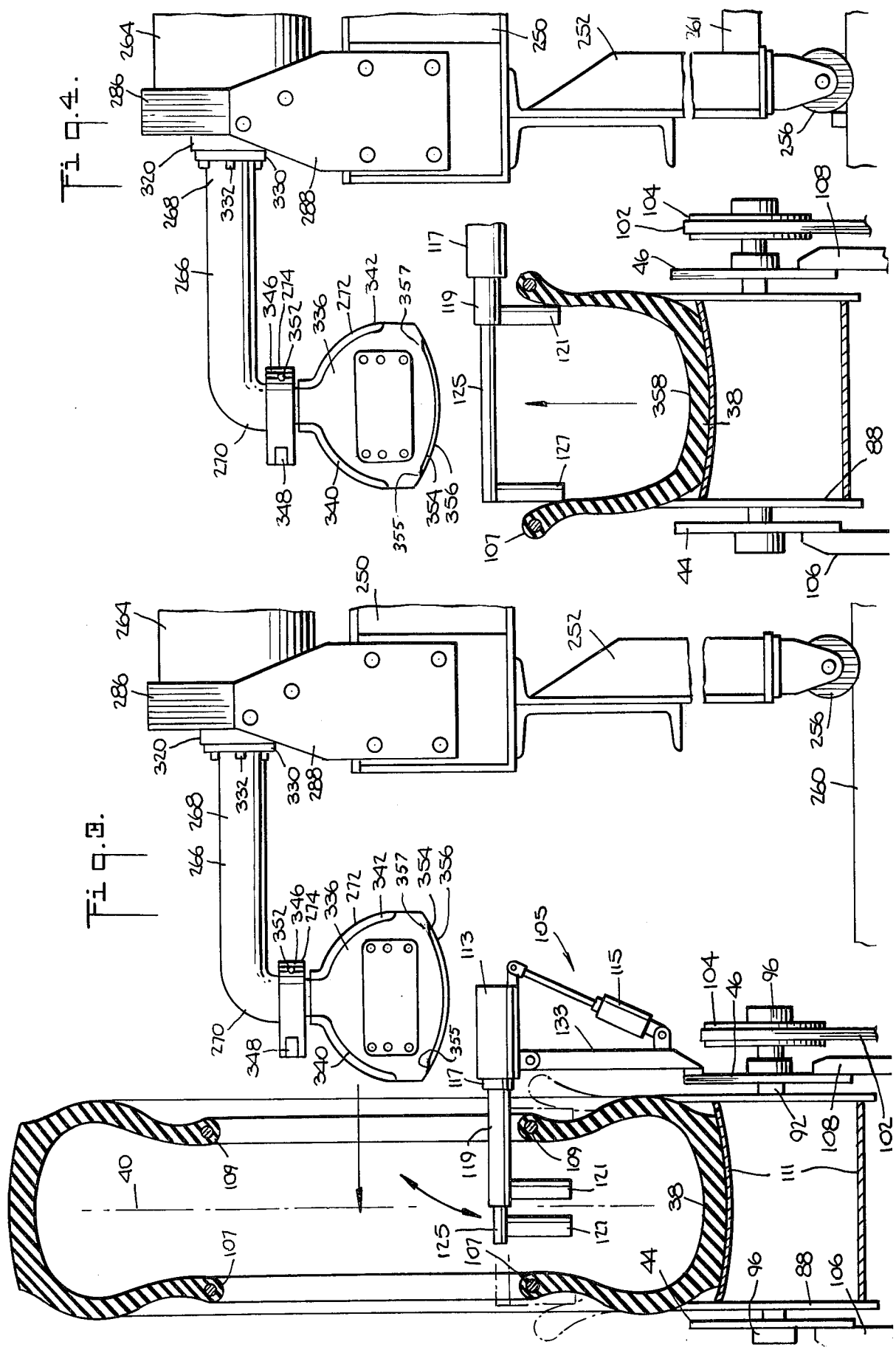

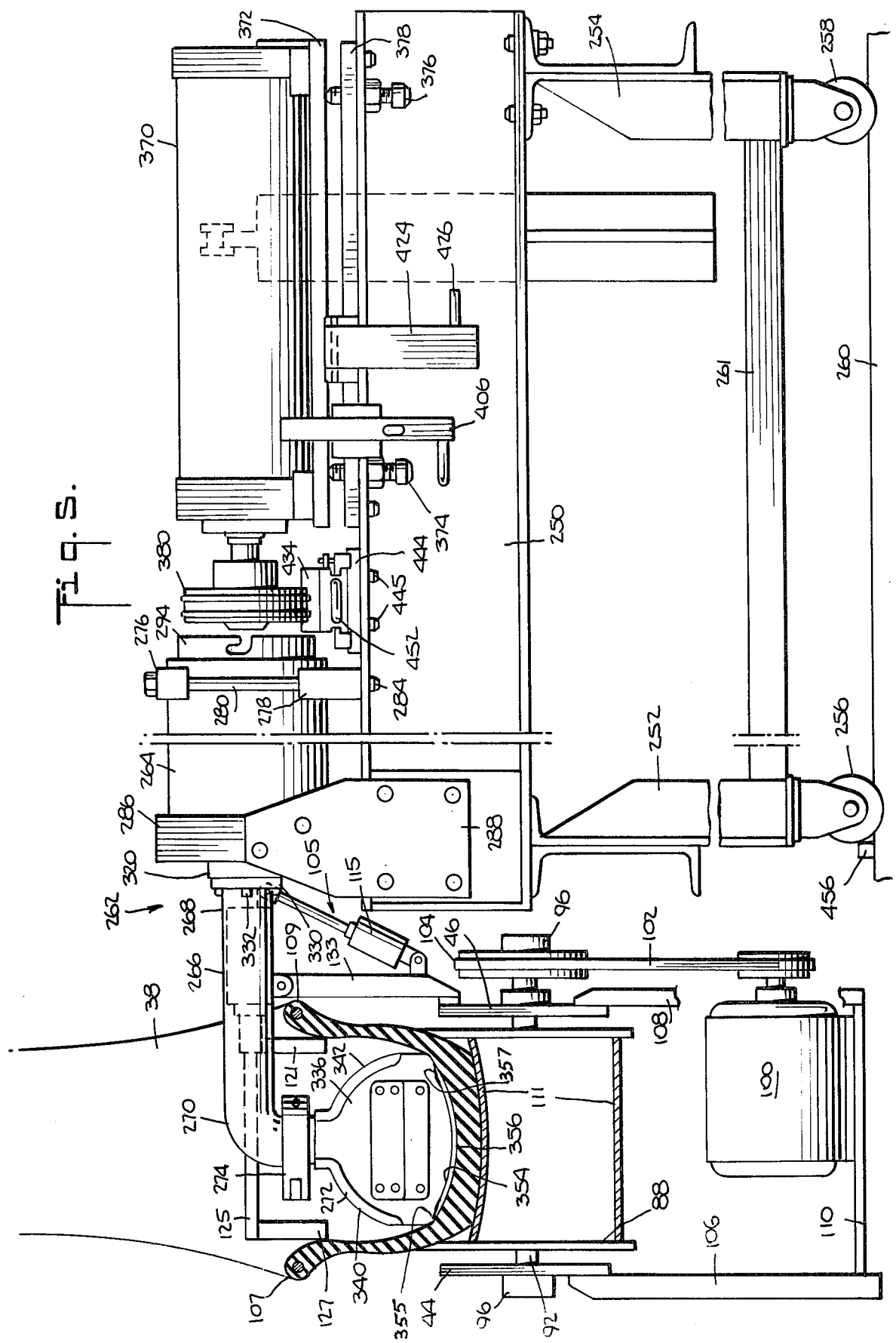

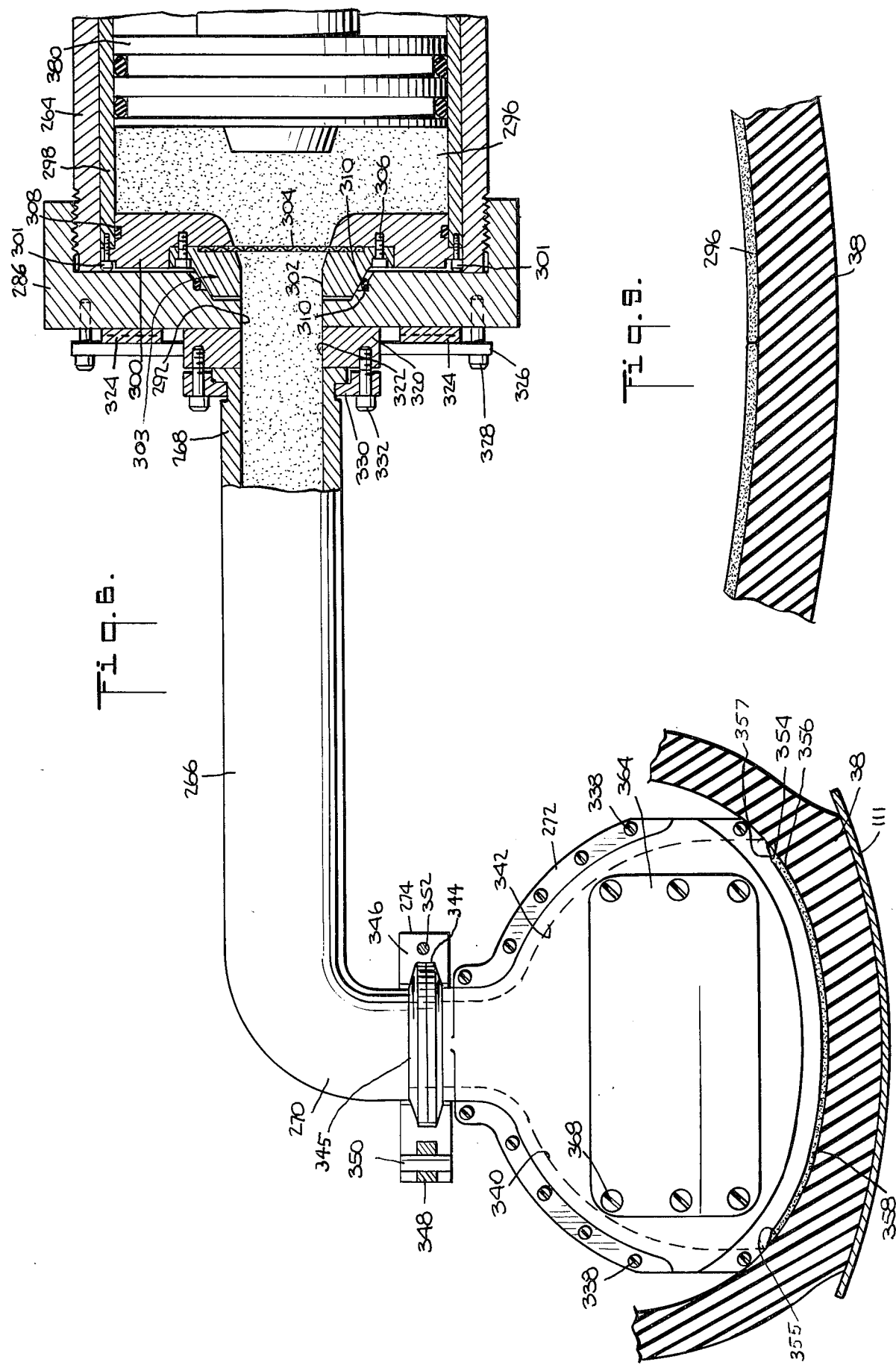

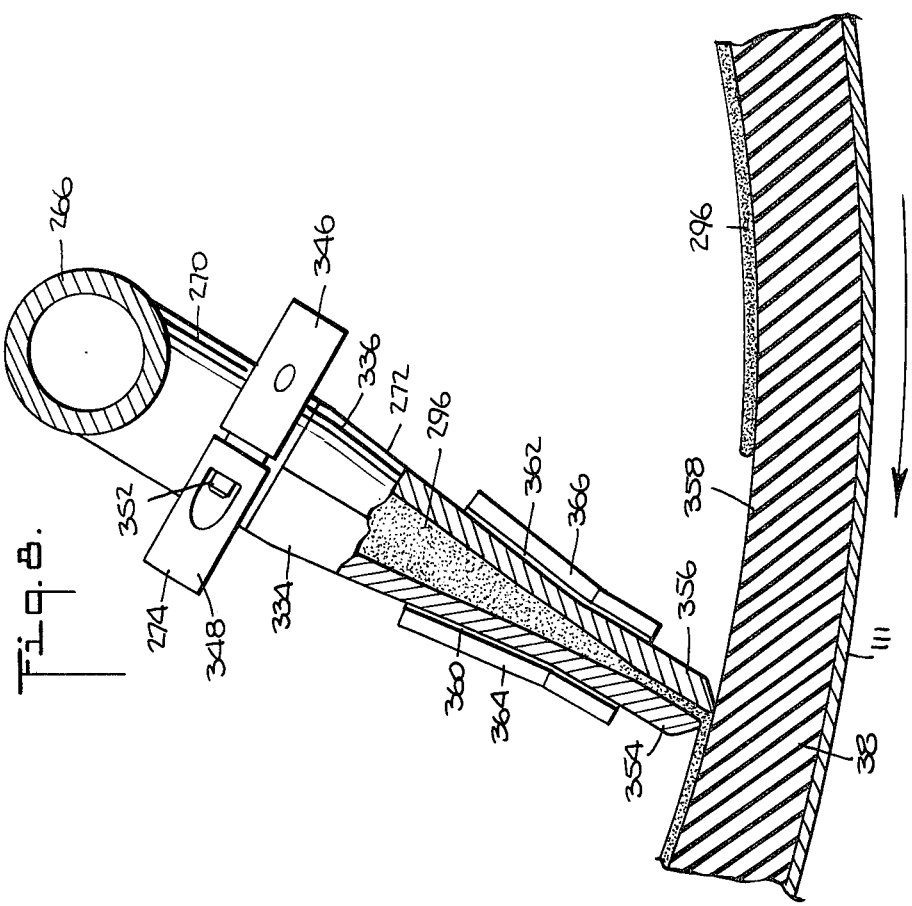
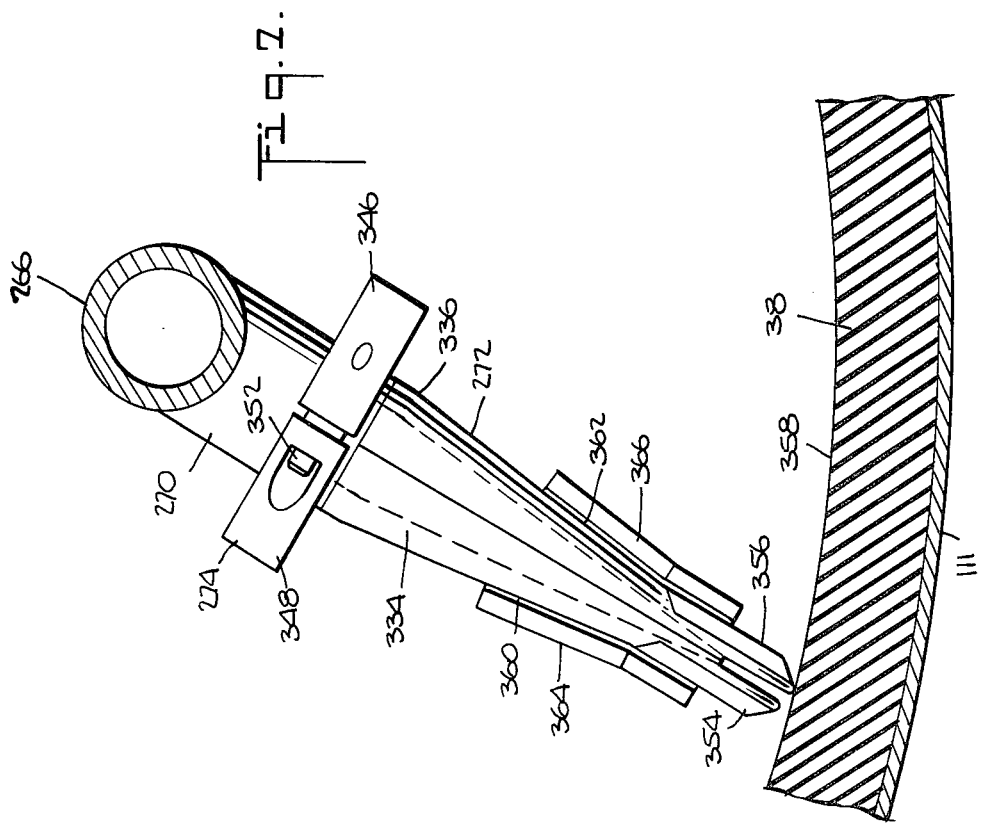

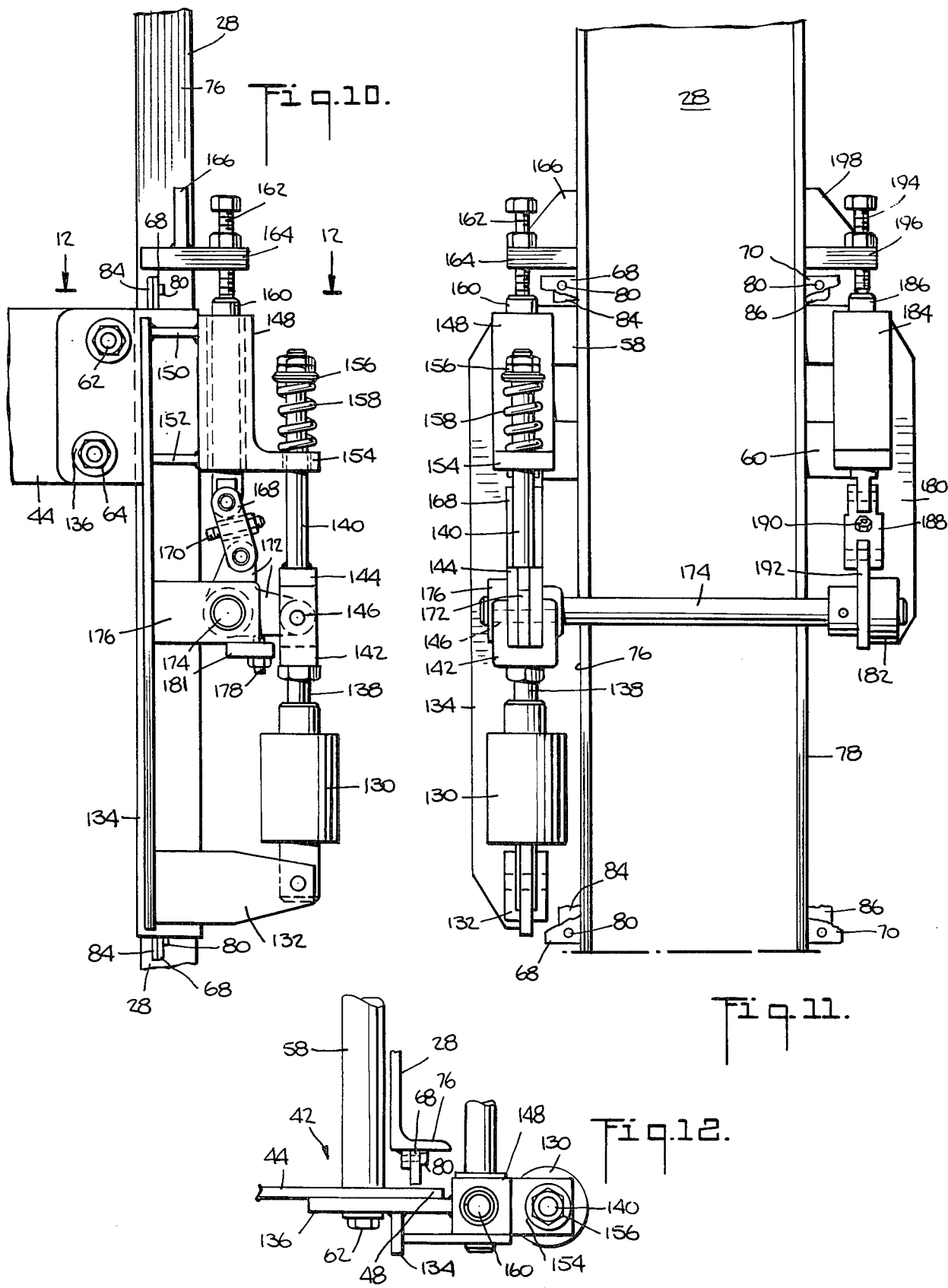

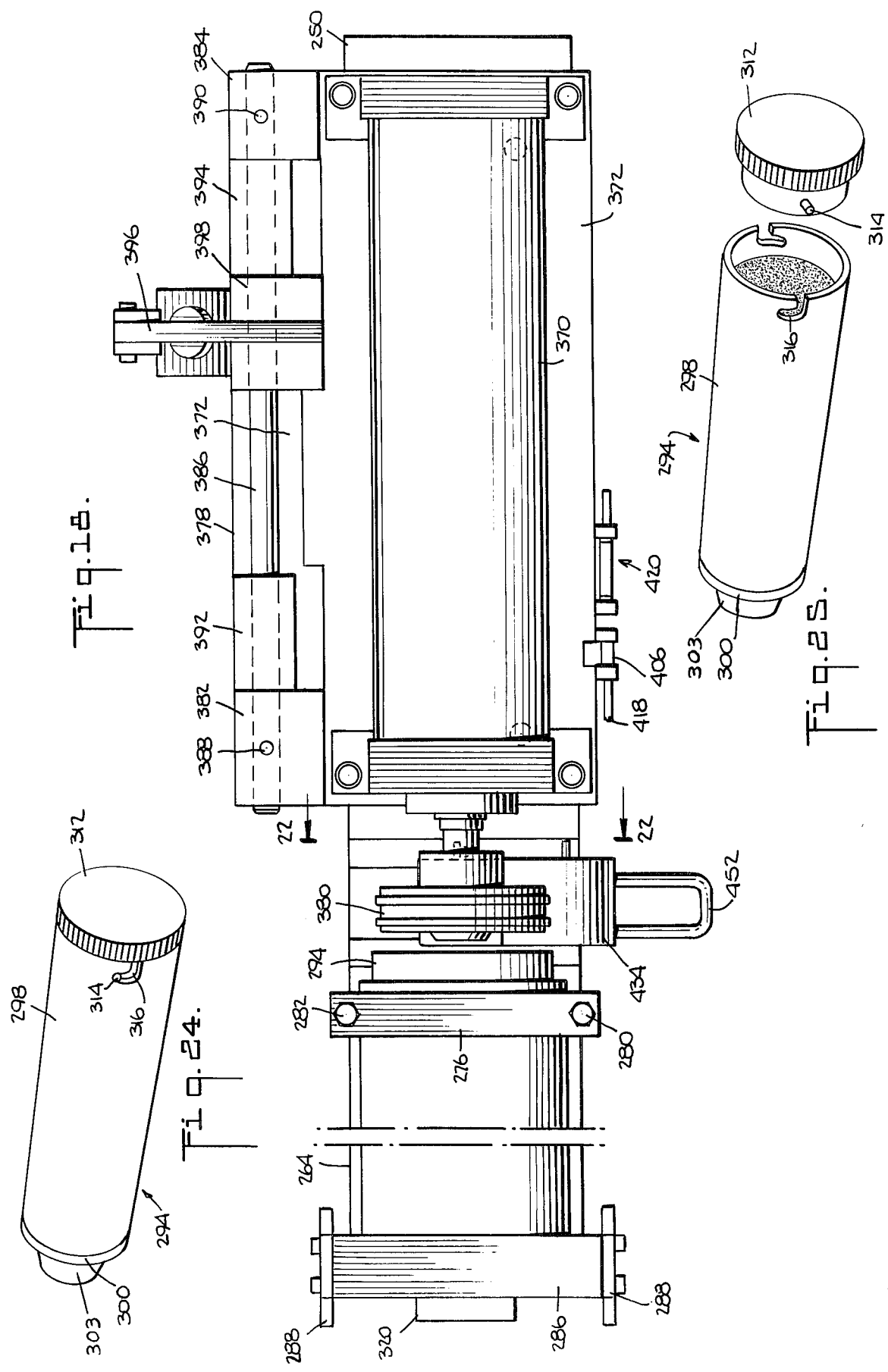

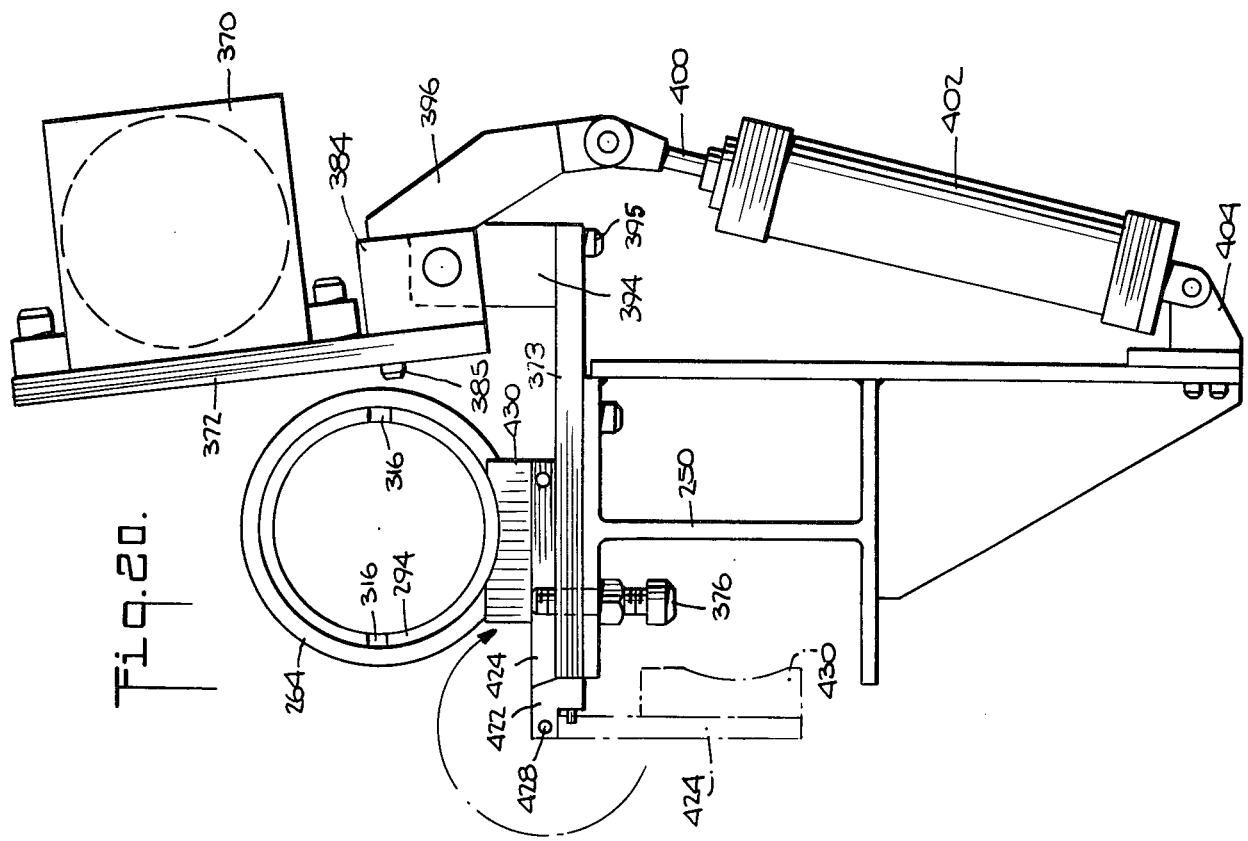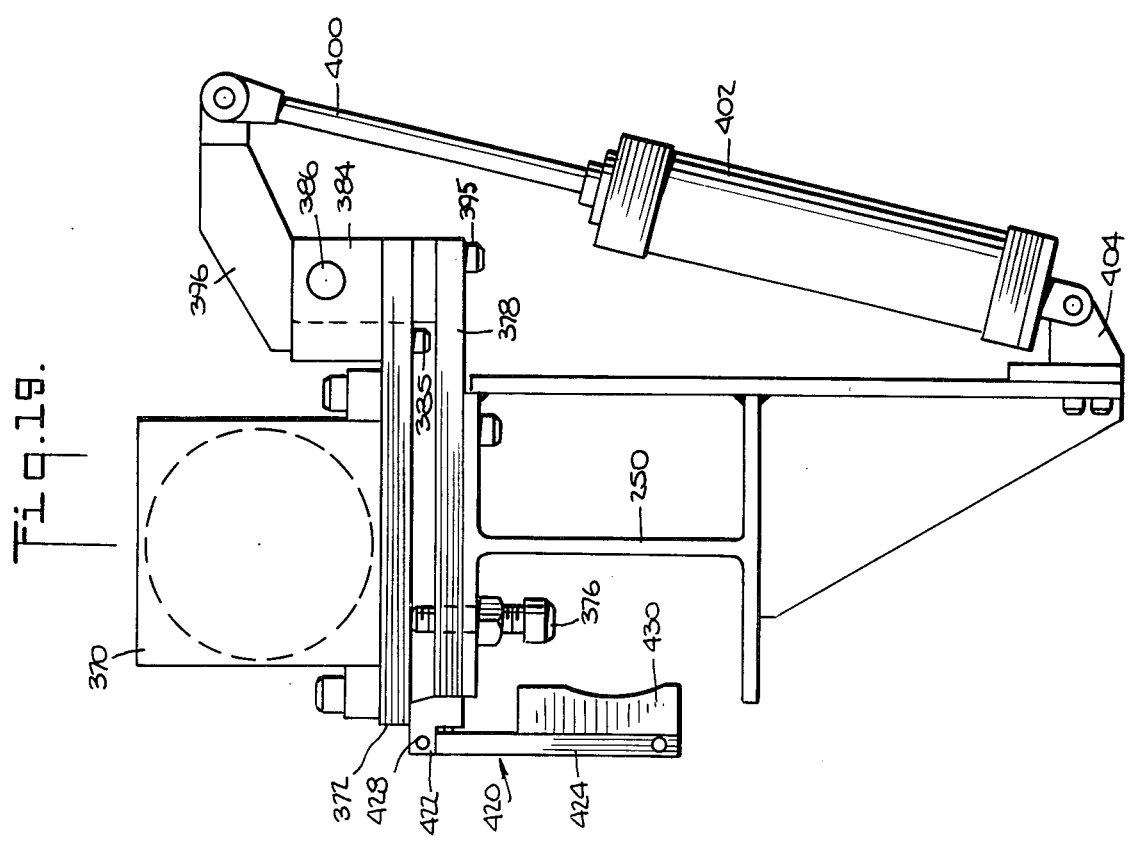

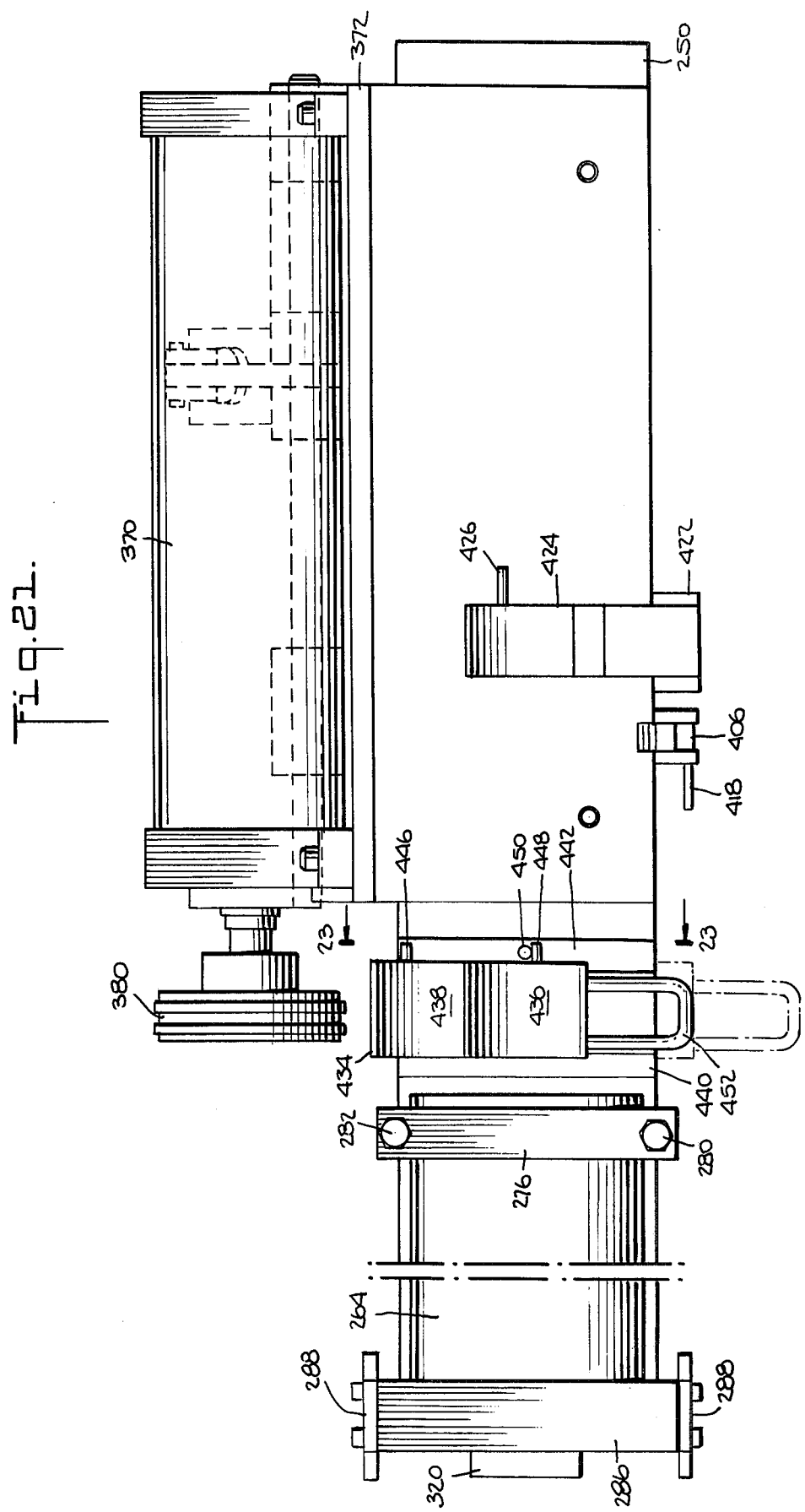

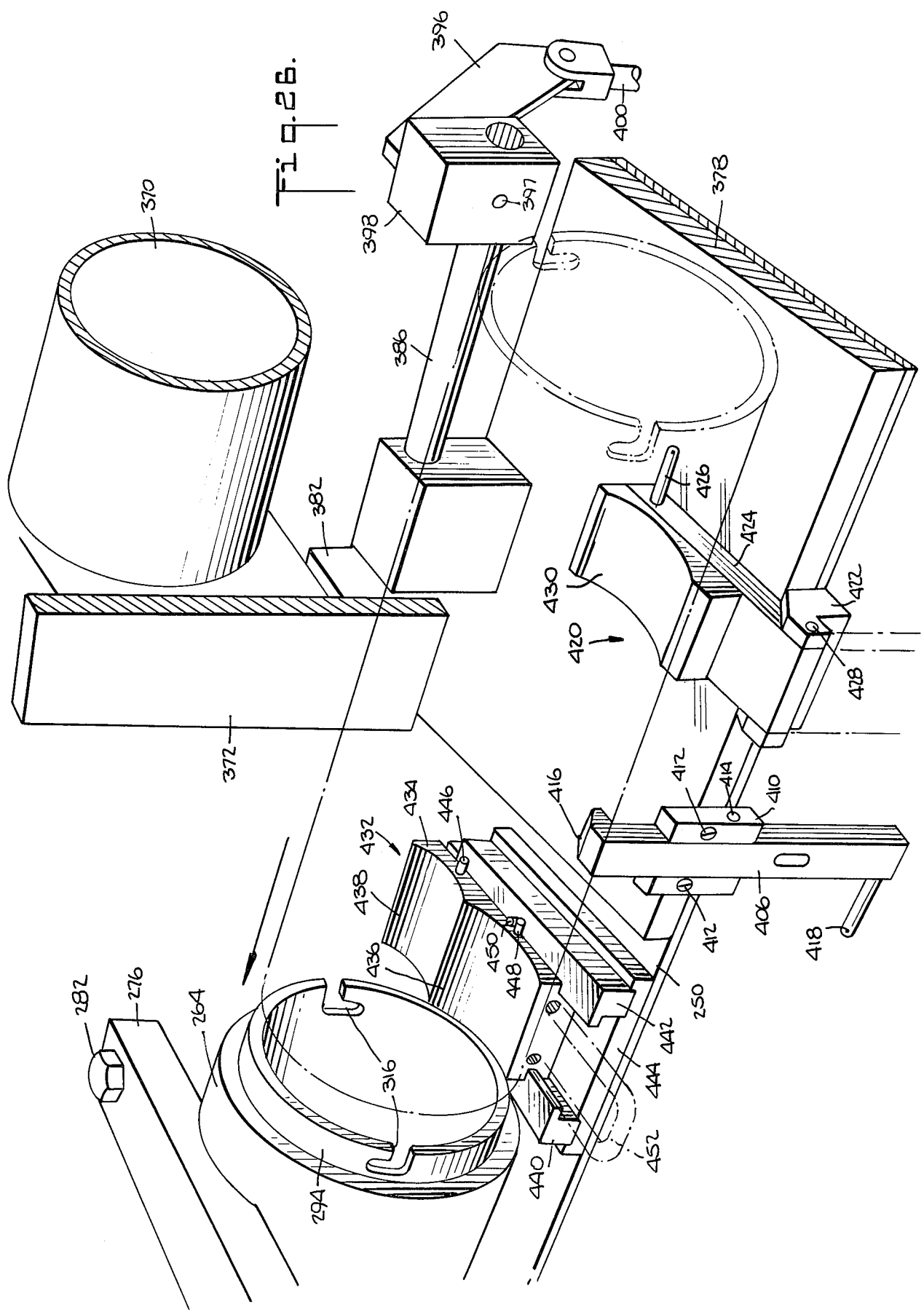

APPARATUS AND METHOD FOR APPLYING PUNCTURE SEALANT MATERIAL TO A TIRE

This invention relates to tires which are self-sealing when punctured and more particularly to an apparatus and method for applying a coating of puncture sealant material to the liner of a cured tire.

It is well known to numerous motorists that the area of a tire most vulnerable to punctures extends from shoulder to shoulder across the tread. Occasionally punctures caused by a metallic or glass object will cause a slow leak of air outwardly of the tire because the puncture causing object remains embedded in the tread and plugs the hole caused by the puncture. Although slow leaks are generally imperceptible for hours or days after the tire puncture has occured, the tire repair procedure is usually similar to that used for repair of punctures that cause rapid and almost immediate discharges of air from the tire.

Regardless of whether a puncture causes slow or sudden flatness of a tire, the repair of the tire is usually at the inconvenience of the vehicle operator.

Attempts to deal with the problem of flat tires due to tire punctures have led to the development of self-sealing tires which are provided with coatings of adhesive or sealant on the interior liner of the tire such as shown in U.S. Pat. Nos. 3,952,787 and 3,881,537. In such tires, when a puncture occurs, the interior air pressure usually forces the tire sealant material into and around the puncture to plug the puncture and prevent a discharge of air from the tire. The punctured tire, when effectively plugged by the sealant material, can be driven upon without being repaired thereby eliminating the inconvenience factor associated with tire punctures.

One known method of providing a cured tire with tire sealant material is to spray the inner surface of the tire with sealant as disclosed in U.S. Pat. No. 3,935,893. This procedure may require several spraying operations with intermittent curing to furnish an adequate layer of sealant. Moreover, the spraying operation usually does not yield a consistent thickness of tire sealant material on the tire liner. Consequently, certain areas of the tire may have less sealant than others and are thus less likely to provide as dependable a seal as those tire areas having thicker layers of sealant material.

Another known method of applying sealant material to a tire requires a sheet of sealant material, such as formed in an extrusion process, and an adherance of the extruded sheet to the tire as disclosed in U.S. Pat. No. 3,952,787. This is a cumbersome procedure since the sealant material must first be fashioned in sheet form and then cut to size to properly fit against the tire liner before it can be adhered.

It is thus desirable to provide an apparatus that simultaneously forms and applies a sealant layer of predetermined cross-section to the interior liner of a tire.

Among the several objects of the present invention may be noted the provision of a novel apparatus for applying tire puncture sealant material to the liner of a cured tire, a novel apparatus that supports and rotates a tire while sealant material is being applied to the liner of the tire, and a novel apparatus that applies a fluid sealant material to the liner of a cured tire in a layer of predetermined cross-section.

Other objects and features will be in part apparent and in part pointed out hereinafter.

The present invention relates to a novel apparatus and method for applying a tire puncture sealant material to the liner of a cured tire under the tread region thereof. The apparatus, in a preferred embodiment includes a frame that supports an uninflated, unmounted tire in a position wherein the equatorial plane of the tire is substantially vertical. The frame includes means for raising, lowering and rotating the tire. The apparatus also includes a sealant applicator that is movable toward or away from the tire mounted on the frame. The sealant applicator includes an application head with a slit-like opening for discharging a uniformly wide layer of sealant of predetermined cross-section to the liner of the tire. A hydraulic cylinder associated with the sealant applicator protracts a piston into a sealant tank to cause a constant flow of sealant from the tank through the application head to the tire.

In operation of the tire sealant apparatus a tire is mounted in the frame and the application head of the sealant applicator is moved toward the frame directly over the interior annular liner of the tire. The frame then raises the tire to permit the tire liner to engage the application head of the sealant applicator. A bead separating device for spreading apart the tire beads facilitates engagement between the application head and the tire liner. The tire is rotated on the frame and sealant is caused to flow outwardly of the application head by the hydraulic cylinder to coat the tire liner with a sealant layer of predetermined cross-section. A full application of sealant is provided in one revolution of the tire, the end portions of the sealant layer on the tire liner forming a butt joint. In another embodiment of the invention a drop off mechanism incorporated on the frame lowers the tire near the end of the first revolution to permit an overlap splice of the sealant at the end portions of the sealant layer.

After the tire has been layered with sealant, the frame lowers the tire away from the application head and the sealant applicator is moved away from the frame to permit removal of the coated tire.

When a supply of sealant in the sealant applicator is exhausted, the hydraulic cylinder piston is retracted from the supply tank and the entire cylinder is pivoted laterally out of alignment with the supply tank to permit its reloading in breech fashion.

The invention accordingly comprises the constructions and methods hereinafter described, the scope of the invention being indicated in the following claims.

In the accompanying drawings in which various possible embodiments of the invention are illustrated, FIG. 1 is a perspective view of a tire sealant apparatus incorporating one embodiment of the present invention;

FIG. 3 is a side sectional view taken along the line 3—3 of FIG. 2 showing the sealant applicator in a position remote from the tire;

FIG. 4 is a view similar to FIG. 3 showing the sealant applicator positioned directly over the interior liner of the tire;

FIG. 5 is a side view of the sealant applicator in engagement with the tire liner;

FIG. 6 is an enlarged fragmentary side view of the sealant applicator and tire partly shown in section;

FIG. 7 is an enlarged fragmentary front view of the sealant applicator in an inclined engagement with the tire prior to sealant application;

FIG. 8 is an enlarged fragmentary front view similar to FIG. 7 showing application of the sealant to the tire;

FIG. 9 is an enlarged fragmentary sectional view of the tire showing terminal ends of the sealant coating in a butt joint after the sealant application has been completed;

FIG. 10 is an enlarged fragmentary front view of a drop off mechanism in a first operating position;

FIG. 11 is an enlarged fragmentary side view of the drop off mechanism;

FIG. 12 is an enlarged fragmentary sectional view taken along the line 12—12 of FIG. 10;

FIG. 18 is a top plan view of the apparatus omitting the frame and a portion of the sealant applicator;

FIG. 19 is a rearward end view thereof;

FIG. 20 is a view similar to FIG. 19 showing the apparatus in another position;

FIG. 21 is a plan view of the apparatus corresponding to FIG. 20;

FIGS. 24 and 25 are perspective views of a sealant cartridge; and

FIG. 26 is a perspective view corresponding to FIG. 20.

Corresponding reference characters indicate corresponding parts throughout the several views of the drawings.

Figure 1:
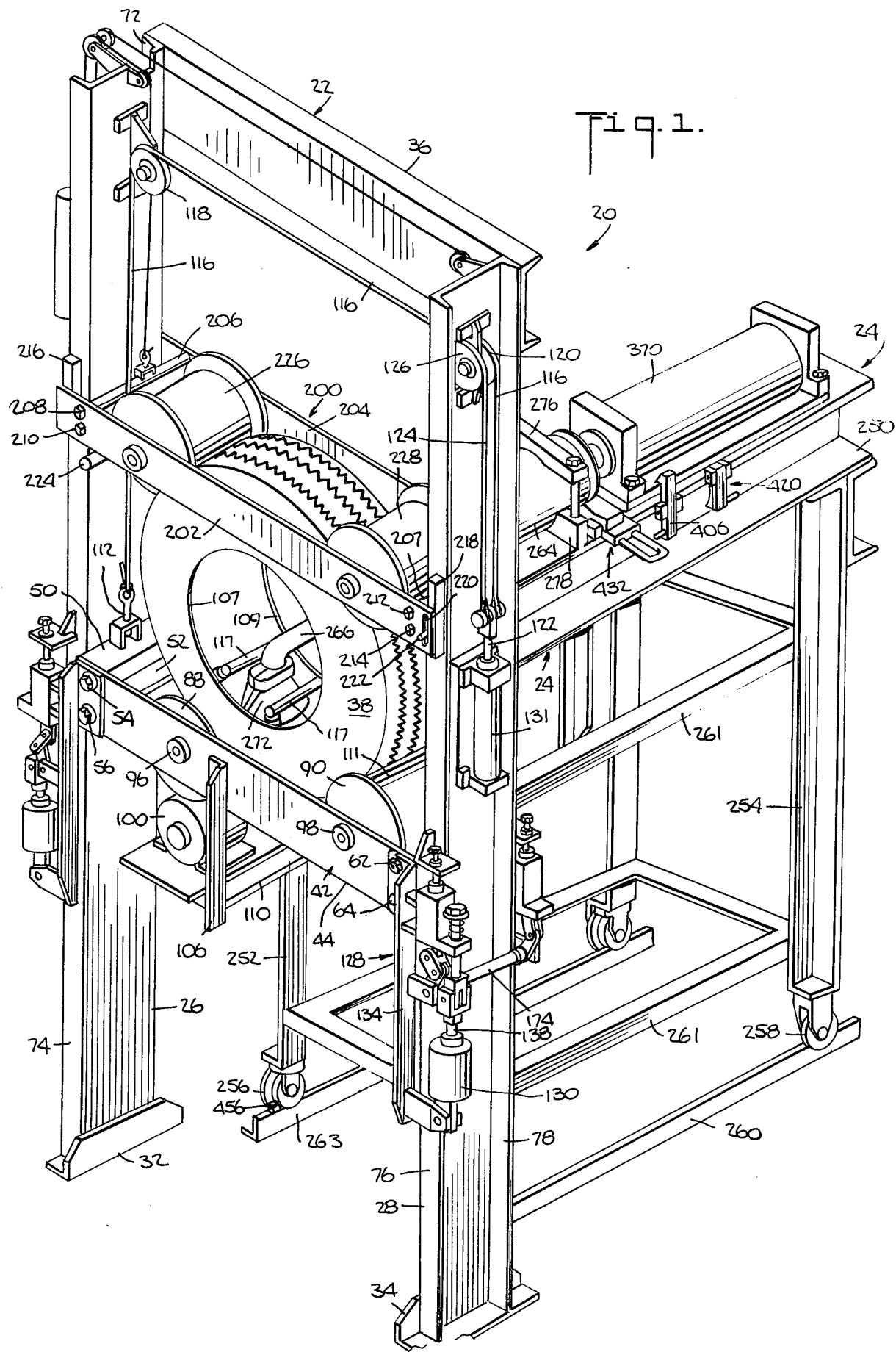

Referring to the drawings, a tire sealant apparatus is generally indicated by reference number 20 in FIG. 1. The tire sealant apparatus 20 comprises a fixed frame 22 and a movable carriage member 24.

The frame 22 includes a pair of spaced and oppositely disposed upright members 26 and 28 anchored to a ground surface such as a floor 30 at pedestals 32 and 34. The respective upper ends of the upright members 26 and 28 are joined by a bridge member 36.

The frame 22 also includes means for supporting and rotating an unmounted, uninflated cured tire 38 with the equatorial plane 40 (FIG. 3) in substantial vertical orientation. The supporting and rotating means include an elevator member 42 extending across the upright members 26 and 28. The elevator member 42 comprises spaced elongated cross plates 44 and 46 having opposite end portions such as 48 (FIG. 12) straddling the respective upright members such as 28. The distance between the cross plates 44 and 46 is maintained by tubular spacer members 50, 52 provided at one end portion of the cross plates 44 and 46, and fastened thereto by fasteners 54 and 56. Similarly a pair of tubular spacer members 58 and 60 provided at the opposite end portion of the cross plates 44 and 46 are fastened thereto by fasteners 62 and 64. Suitable clearance is provided between the tubular spacer members 50, 52, 58 and 60 and the respective upright members 26 and 28 as most clearly shown by the relationship of the members 58 and 28 in FIG. 12.

Adjustable elongated rail members such as 66, 68 and 70 are respectively provided on flanges 74, 76 and 78 of the upright members 26 and 28 for engagement with corresponding end portions of the cross plates 44 and 46. Although not shown, a similar rail member is provided on a flange 72 of the upright member 26. The rail members 66, 68 and 70 are respectively fastened by fasteners 80 to elongated bar members 82, 84 and 86 that are welded to the respective flanges 74, 76 and 78.

The elevator member 42 also includes a pair of spaced flanged rollers 88 and 90 axially supported on shafts 92 and 94, having respective end caps 96, 96 and 98, 98 at the cross plates 44 and 46. The roller 88 is driven by a motor 100 having a drive belt 102 arranged around a pulley 104 keyed to the roller shaft 92. The motor 100 is affixed to the elevator member 42 in any suitable known manner such as by brackets 106 and 108 that interconnect a motor support plate 110 to the cross plates 44 and 46. An endless belt 111 arranged to pass around the rollers 88 and 90 is engageable with the outer tread periphery of the tire 38.

A bead spreading device 105 for spreading the beads 107 and 109 of the tire 38, and moveable with the elevator member 42 is shown schematically for purposes of clarity. The bead spreader device 105 includes a support member 133 affixed to the cross plate 46. A housing 113 is pivoted to the support member 133, pivotal movement of the housing 113 being governed by an actuator 115.

The housing 113 accommodates an actuator 117 having an actuator arm 119 with a depending cylindrical roller 121. The housing 113 also accommodates an actuator 123 (FIG. 17) having an actuator arm 125 with a depending cylindrical roller 127 extending beyond the roller 121 as shown in FIG. 4.

The bead spreading device 105 has an intermediate position wherein the actuator arm 119 is protracted from the actuator 117 and the actuator arm 125 is retracted with respect to the actuator 123 to present the depending cylindrical rollers 121 and 127 in relative close proximity such that both the rollers 121 and 127 are easily accommodated between the beads 107 and 109 of the tire 38.

The bead spreading device 105 is movable to an inactive position wherein the housing 113 is pivoted out of the intermediate position by the actuator 115 to remove the cylindrical rollers 121 and 127 from disposition between the tire beads 107 and 109.

The bead spreading device 105 is also movable to an active position (FIG. 4) from the intermediate position wherein the actuator arm 119 is retracted from the actuator 117 to permit disposition of the cylindrical roller 121 against the tire bead 109, and wherein the actuator arm 125 is protracted from the actuator 123 to permit disposition of the cylindrical roller 127 against the tire bead 107. It will be apparent from FIGS. 3 and 4 that the rollers 121 and 127 spread the tire beads 107 and 109 when the bead spreader device 105 is in its active position as shown in FIG. 4.

Figure 17:
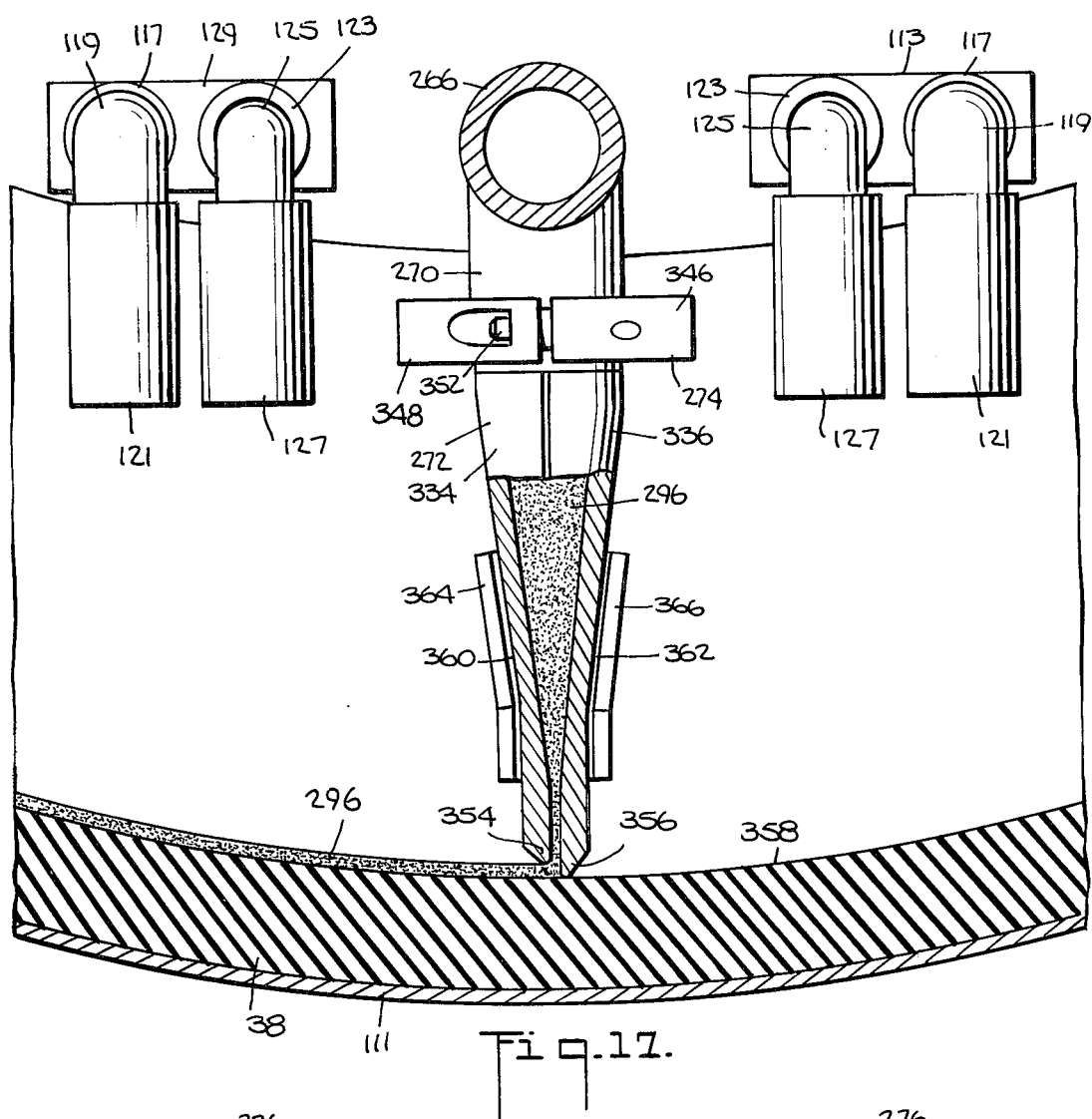
FIG. 17 is an enlarged fragmentary front view of the bead spreading device, with the sealant applicator in normal engagement with the tire prior to sealant application.

A housing 129 spaced from the housing 113 as shown in FIG. 17 is identical to the housing 113. Although not shown, the housing 129 is similarly carried on the support member 133 and simultaneously pivoted with the housing 113 by the actuator 115 which has a common connection with the housing 129. The housing 129 also includes the actuators 117, 123, the actuator arms 119, 125 and the cylindrical rollers, 121, 127 for substantially simultaneous movement with the housing 113 into the inactive, intermediate and active positions previously described.

An elevator system for the elevator member 42 comprises a pair of cable anchors 112 and 114 affixed to the respective tubular spacer members 50 and 58. A cable 116 secured at one end to the anchor 112 is arranged to pass around a pulley 118 mounted to the upright member 26 and across the frame 22 around a pulley 120 mounted in the upright member 28. The opposite end of the cable 116 is connected to a pneumatic cylinder 131 at an actuator rod 122. The cylinder 131, which is of any suitable known construction such as made by Miller Fluid Power Corp., Bensenville, Ill., Model A66B, is affixed to the upright member 28 between the flanges 76 and 78.

A cable 124 secured at one end to the anchor 114 is arranged to pass around a pulley 126 mounted to the upright member 28 on a common shaft with the pulley 120.

The frame 22 also includes a drop-off mechanism 128 for the elevator member 42 provided at opposite ends of the cross plates 44 and 46. The drop-off mechanism 128 is symmetrically constructed at either end of the elevator member 42 and the structure hereinafter described in association with the upright member 28 is typical. It should be noted that the drop-off mechanism 128 has been omitted from FIG. 2 to permit a clearer rendition of structure overlapped by the mechanism.

As best seen in FIGS. 1 and 10–13 the drop-off mechanism 128 comprises a pneumatic air cylinder 130 of any suitable known construction, pivoted at one end to an armpiece 132. The armpiece 132 extends from one end of a bracket 134 that is bolted at its opposite end flange 136 to the cross plate 44 by means of the fasteners 62 and 64. The cylinder 130 includes an actuator rod 138 and an extension rod 140 in a double fork joint 142, 144 pivotally joined at the pin 146.

A collar piece 148 is welded or otherwise suitably affixed to the bracket 134 near the end portion 48 of the cross plate 44. The collar piece 148 also includes reinforcing webs 150 and 152 joined to the bracket 134 and an L-shaped flange 154. A terminal end portion of the extension rod 140 projects through the L-shaped collar flange 154 and is fitted with a nut and washer combination 156. A coil spring 158 is disposed between the L-shaped flange 154 and the nut-washer combination 156 at the terminal end portion of the extension rod 140.

A pin member 160 slidably mounted within the collar piece 148 has one end engageable with an adjustable stop screw 162 threaded to a plate 164. The plate 164 is affixed to the upright member 28 with a reinforcing gusset 166. A straight link member 168 is pivotally connected to an opposite projecting end of the pin member 160. A stop-screw 170 is threaded in the link member 168 for engagement with the bracket 134.

A V-shaped link member 172 is keyed to a rod 174 having one end pivotally mounted on a plate 176 extending from the bracket 134. The V-shaped link, which connects with the straight link 168 and the pin 146, is engageable with a stop screw 178 threaded to a plate 181 that is welded to the plate 176.

The rod 174 extends from the plate 176 of the bracket 134 to a bracket 180 (FIG. 11). The bracket 180 corresponds to the bracket 134 and is bolted to the cross plate 46, in the same manner in which the bracket 134 is bolted to the cross plate 44. The opposite end of the rod 174 is pivotally mounted on a plate 182 identical to the plate 176 of the bracket 134.

The bracket 180 includes a collar piece 184, a pin member 186, a straight link 188 and a stop screw 190 identical to the collar piece 148, a pin member 160, straight link 168, and stop screw 170 of the bracket 134. The bracket 180 also includes a link member 192 having one end pivoted to the straight link 188 and another end keyed to the rod 174. A stop screw 194, plate 196 and gusset 198 are provided on the flange 78 of the upright member 28 identical to the stop screw 162, plate 164 and gusset 166 on the flange 76. The opposite end portion of the elevator member 42 and the upright member 26 includes drop-mechanism structure correspondingly symmetrical to the drop-mechanism structure previously described.

The frame 22 further includes a tire stabilizing member 200 extending across the upright members 26 and 28 over the elevator member 42. The tire stabilizing member 200 comprises spaced elongated cross plates 202 and 204 having opposite end portions straddling the upright members 26 and 28. The distance between the cross plates 202 and 204 is maintained by tubular spacer members such as 206 and 207, identical to the tubular spacer members 50, 52, 58 and 60 provided on the elevator member 42. Fasteners 208, 210, 212 and 214 on the cross plate 202 are correspondingly identical to the fasteners 54, 56, 62 and 64 on the cross plate 44. Suitable clearance as typically shown in FIG. 12 for the elevator member 42 is provided between the upright members 26 and 28 and the tubular spacer members such as 206 and 207 on the tire stabilizing member 200.

Slide bars, such as 216 and 218 are affixed to the upright members 26 and 28 intermediate the respective end portions of the cross plates 202 and 204 and the flanges 72, 74, 76 and 78 to permit slidable movement of the cross plates 202 and 204 thereon. Corresponding end portions at one end of the cross plates 202 and 204 include a guide slot 220 slidably engageable with a guide pin 222 (FIG. 1). Corresponding end portions at an opposite end of the cross plates 202 and 204 are supported on a rod 224 affixed to the upright member 26. The rod 224 is not affixed to the cross plates 202 and 204.

The tire stabilizing member 200 also includes a pair of spaced flanged rollers 226 and 228 rollably mounted between the cross plates 202 and 204 in a manner identical to that described for the rollers 88 and 90 on the elevator member 42.

A traction system for the tire stabilizing member 200 comprises a pair of cable anchors 230 and 232 affixed to the respective tubular spacer members 206 and 207 in a manner identical to that previously described with respect to the anchor members 112 and 114 on the elevator member 42. A cable 234 secured at one end to the anchor 230 is arranged to pass around a pulley 236 mounted to the upright member 26. An opposite end of the cable 234 connects to a weight holder 238 that carries weights 240 alongside the upright member 26.

A cable 244 secured at one end to the anchor 232 is arranged to pass around a pulley 246 on the upright member 28 and across the frame 22 around a pulley 248 mounted in the upright member 26. An opposite end of the cable 244 connects to the weight holder 238 in common with the cable 234.

The movable carriage member 24 comprises a cross beam 250 with support legs 252, 252 and 254, 254 having respective rollers 256, 256 and 258, 258 engageable with tracks 260 and 263. The legs 252 and 254 are reinforced by brace members 261, 261.

A sealant applicator means 262 supported on the cross beam 250 comprises a generally cylindrical sealant supply housing 264. The sealant applicator means 262 also includes a delivery pipe 266 having an end portion 268 that communicates with the supply housing 264 and an opposite end portion 270 joined to a sealant applicator head 272 by a detachable peripheral coupling member 274.

The sealant supply housing 264 has a rearward end portion clamped to the cross beam 250 by an upper strap member 276 and lower cradle member 278 connected by a pair of bolts 280 and 282 extending through the cross beam 250 for engagement with respective nuts 284 284.

The sealant supply housing 264 has a forward threaded end cap 286 of generally rectangular periphery that rests on the cross beam 250 and is fastened to side plates 288,288 and bolted to the cross beam 250.

Referring particularly to FIG. 6 the end cap 290 has a central opening 292. A cartridge 294 containing sealant 296, such as disclosed in U.S. Pat. No. 3,981,342 is removably disposed in the supply housing 264. The cartridge 294 comprises a main body portion 298 with a forward end cap 300 fastened to the main body portion 298 by fasteners 301. The forward end cap 300 includes a central opening 302 that aligns with the central opening 292 of the end cap 286. A filter screen 304 disposed across the opening 302 is fastened to the end cap 300 by an annular nose piece 303 and fasteners 306. An "O" ring 308 is disposed between the end cap 300 and the main body portion 398, and an "O" ring 310 is disposed between the end caps 286 and 303.

Referring to FIGS. 24 and 25 the rearward end of the cartridge 294 includes an end cap 312 detachably secured to the main body portion 298 by engagement of end cap pins 314 with bayonet slots 316 formed in the main body portion 298.

An annular coupling plate 320 (FIG. 6) having a central opening 322 is welded to the end cap 286 with the opening 322 in alignment with the openings 292 and 302 of the end caps 286,300 and 303. An annular heater element 324 such as made by Chromolox, Pittsburgh is sandwiched between the end cap 286 and an annular clamping plate 326 preferably made of Transite, secured to the end cap 286 by fasteners 328.

The end portion 268 of the delivery pipe 266 is joined to the clamping plate 320 by an annular clamping ring 330 and fasteners 332 engageable with the clamping plate 320.

The sealant applicator head 272 comprises a pair of die members 334 and 336 joined together in clamshell fashion. As most clearly shown in FIG. 6 a plurality of fasteners 338 in corresponding fastening flanges 340 and 342 of each die member 334, 336 maintain the clamshell arrangement. An interior sealant space is defined between the die members 334 and 336 and extends between the fastening flanges 340 and 342.

Each die member 334, 336 is formed with a circular coupling flange 344 (FIG. 6) that engages a circular coupling flange 345 on the end portion 270 of the delivery pipe 266. The coupling member 274 includes diverging jaw members 346, 348 pivotable about a pin 350 and locked together by a fastener 352. The coupling member 274 locks the coupling flanges 344 and 345 together.

The die members 334 and 336 are formed with respective lip portions 354 and 356 and extend between the fastening flanges 340 and 342 (FIG. 6). The lip portions 354 and 356 have a predetermined curvature substantially corresponding to the curvature of the tire liner 358 between the tire shoulders in the area of the tire beads 107 and 109 that have been spread by the bead spreading device 105.

The lip portion 356, which is spaced from the lip portion 354 also extends beyond the lip portion 354 a predetermined amount. The end portions 355 and 357 of the lip 354 taper down toward the lip 356. The spacing between the lip portions 354 and 356, and the stepped arrangement thereof define an elongated opening through which the sealant is discharged.

A pair of heater elements 360 and 362 are respectively secured between the die members 334, 336 and holding plates 364, 366 fastened by fasteners 368.

Means for causing movement of the sealant 296 through the delivery pipe 266 for discharge from the lip portions 354 and 356 of the applicator head 272 comprise a hydraulic cylinder 370, such as model HR-2A6x20 made by Hydroline of Rockford, Ill., affixed to a mounting plate 372 supported on leveling screws such as 374, 376 that extend through the cross beam 250. A base plate 378 is also affixed to the cross beam below the mounting plate 372. The cylinder 370 includes a piston member 380 slidably movable into the rearward end of the cartridge 294, and entirely retractible therefrom.

As best shown in FIG. 18 a pair of pivot blocks 382 and 384 are integrally joined to opposite corner end portions of the mounting plate 372 by fasteners 385. The pivot blocks 382, 384 contain the end portions of a pivot rod 386 locked to the blocks 382, 384 by respective lock pins 388, 390.

A pair of pivot rod support blocks 392 and 394 are respectively disposed adjacent the pivot blocks 382 and 384 and affixed to the base plate 378 as by fasteners 395. The rod 386 is pivotable in the blocks 392 and 394.

A link member 396 has one end portion locked to the pivot rod 386 by a pin 397 in a block 398.

An opposite end portion of the link member 396 is pivotally joined to the actuator rod 400 of a cylinder 402 such as model R2DC2.5x8 made by Hydroline. The cylinder 402 is pivoted at one end to a support flange 404 affixed to the cross beam 250.

A latch member 406 having side pieces 408 and 410 secured to the base plate 378 by fasteners 412 is pivotable about a rod 414 supported in the side pieces 408,410. The latch member 406 has a catch portion 416 engageable with the mounting plate 372, and a handle portion 418.

A cradle member 420 disposed adjacent the latch member 406 includes a pivot bracket 422 affixed to the base plate 378. An arm 424 having a handle 426 is pivotable about a pin 428 in the bracket 422. A cradle piece 430 preferably made of plastic, is affixed to the arm 424 and formed with a concave curvature substantially corresponding to the curvature of the cartridge main body portion 298.

A support member 432 disposed adjacent the rearward end of the sealant supply housing 264 includes a cradle arm 434 having concave curved portions 436 and 438. The cradle arm 434 is slidable between spaced rails 440 and 442 affixed to a plate 444 secured to the cross beam 250 by fasteners 445. Projecting pins 446 and 448 extend from one side of the cradle arm 434 for engagement with a stop pin 450 extending from the rail 442. A handle 452 is provided at one end of the cradle arm 434.

Figure 2:
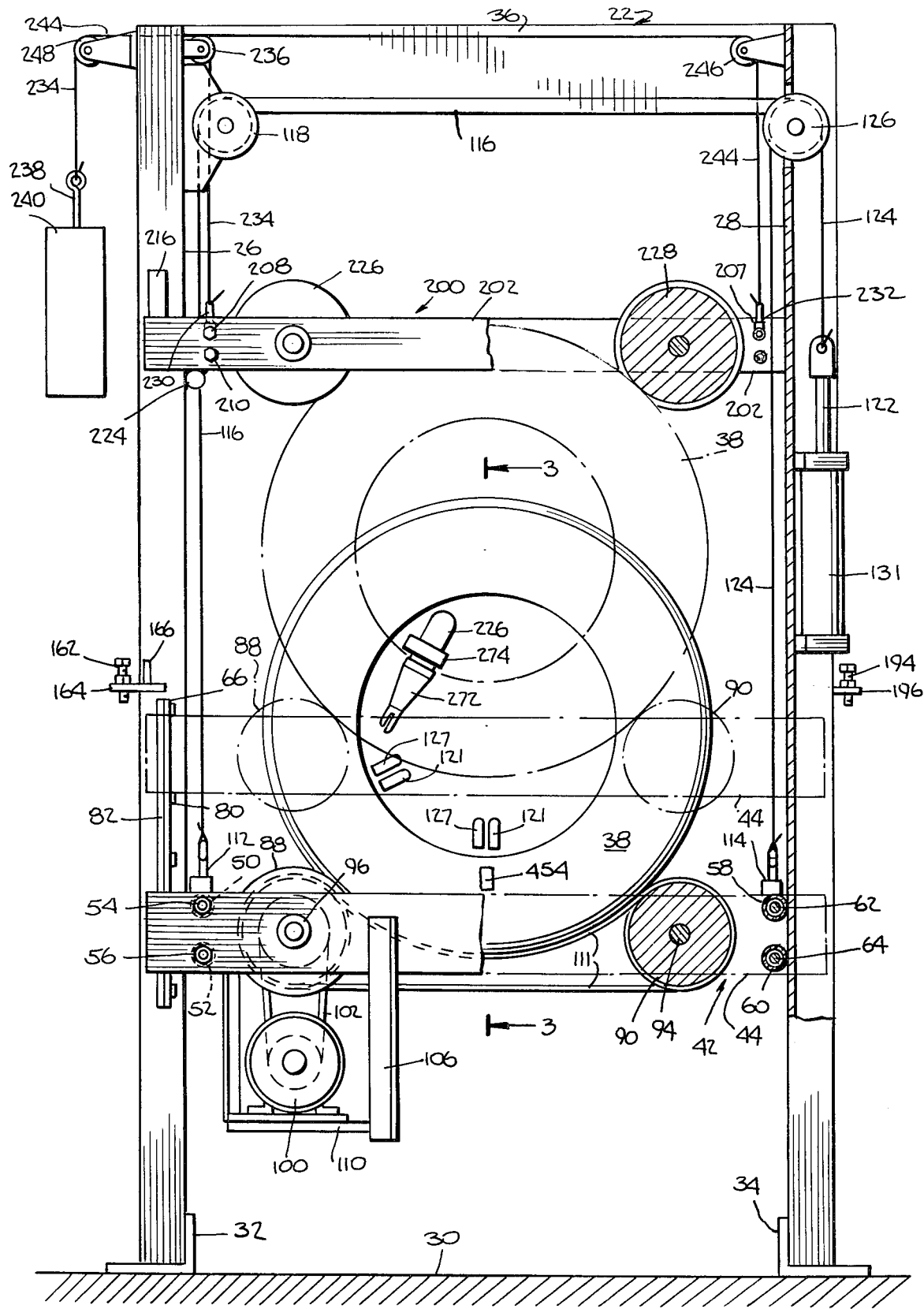
FIG. 2 is a front elevational view thereof, with portions of a drop off mechanism omitted for the sake of clarity, the dotted line elements showing the tire in a raised position.
Figure 13:
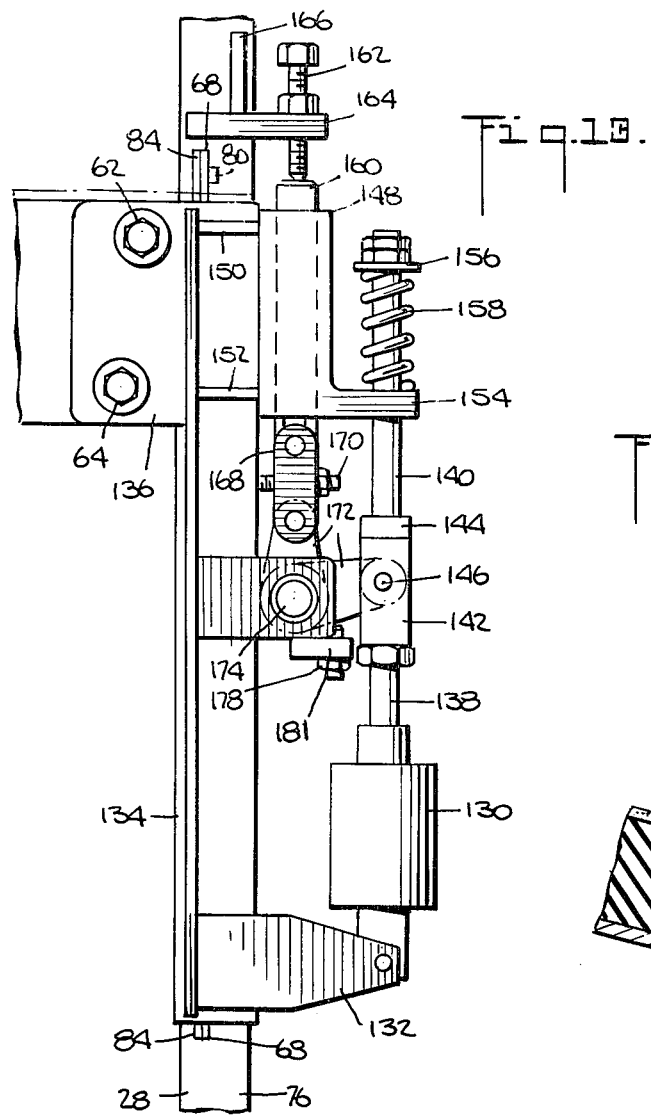
FIG. 13 is view similar to FIG. 10 showing the drop off mechanism in a second operating position.
Figure 14:
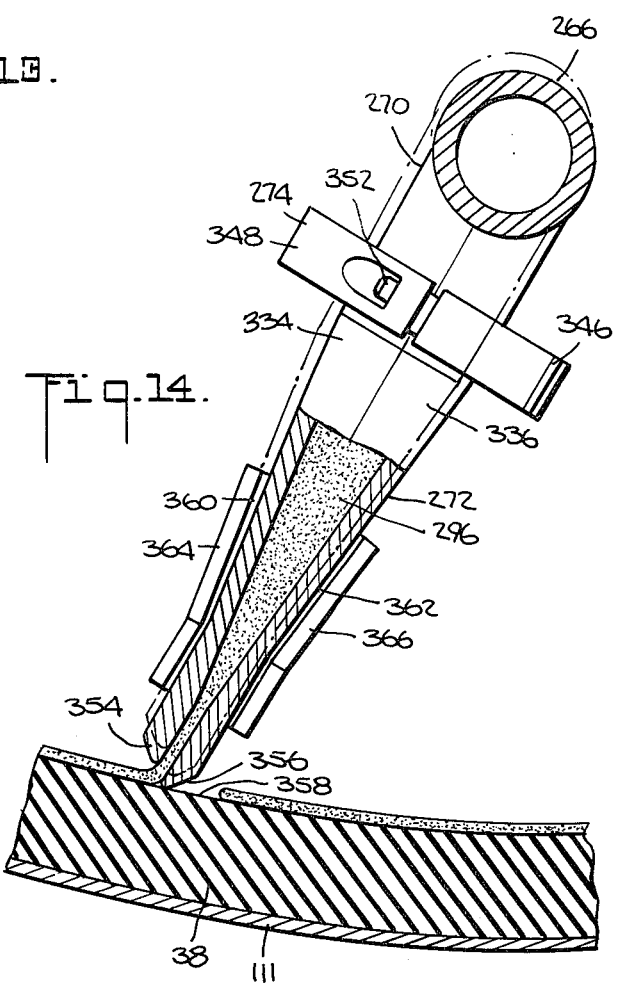
FIG. 14 is an enlarged fragmentary front view of the sealant applicator and tire in a position that corresponds to the first operating position of the drop off mechanism.

The tire 38, before being installed on the frame 22, is preheated at a temperature range of approximately 150°–180° F and washed free of any lubricant. Preferably the tire 38 is at a slightly cooler temperature than the hot sealant 296 during the coating step because the sealant tends to stick more readily to warm material. In operation, the preheated, prewashed tire 38 is weighed and placed on a known bubble balance device (not shown) to determine the location of the unbalanced or light portion of the tire. A strip of tape 454 or other indicating mark is placed on the light portion of the tire 38 preferably along the sidewall. The actuator rod 122 of the cylinder 133 is protracted to place the elevator member 42 in a lowered position. The tire 38 is disposed on the endless belt 111 of the lowered elevator member 42 with the taped portion of the tire in a lowermost position as shown in FIG. 2.

The bead spreader device 105, which is in an inactive position is pivoted by the cylinder 115 to an intermediate position wherein the cylindrical rollers 121 and 127 are disposed between the tire beads 107 and 109 without contacting said beads. The actuators 117 are energized to move the cylindrical rollers 121, 121 against the tire bead 109 by a predetermined retraction of the actuator arm 119. Substantially simultaneously the actuators 123, 123 are energized to move the cylindrical rollers 127, 127 against the tire bead 107 by a predetermined protraction of the actuator arm 125. The cylindrical rollers 121, 121, and 127, 127 thus spread apart the tire beads 107 and 109 a predetermined amount to furnish the tire liner 358 between the tire shoulders with a predetermined cross-sectional profile in the area the spread beads intermediate the respective cylindrical rollers 121, 121 and 127, 127.

The carriage member is moved in any suitable known manner toward the frame 22 along the tracks 261 and 263 to a stop position defined by engagement of the rollers 256, 256 with a limit bar such as 456 on the track 260 (FIG. 5). With the carriage member 24 thus positioned against the limit bar 456 the applicator head 272 is positioned within the tire 38 annulus directly over the tire liner 358 in the area of the spread beads 107 and 109.

The elevator member 42 elevates upon a predetermined retraction of the actuator rod 122 by the cylinder 131 to a first operating position wherein the preadjusted stop screws 162, 162, 194, 194 engage the pins 160, 160, 186, 186 (FIGS. 10, 11). As viewed in FIG. 10, the stop screw 178 limits clockwise movement of the link 172. With the elevator member 42 thus elevated the applicator head is engaged with the tire 38 as shown in FIG. 7. This engagement permits substantially continuous contact between the lip portion 356 and the tire liner 358, due to the corresponding preformed curvatures of the lip portion 356 and the tire liner 358.

It should be noted that the elevator member 42 is entirely suspended by the cables 116 and 120 that connect to the actuator rod 122. For example, with reference to FIG. 12 the cross plate 44 is slidably engageable with the elongated rail member 68 on the upright member 28.

When the elevator member 42 is elevated to its first operating position as described, the upper peripheral portion of the tire 38 is brought into engagement with the rollers 226 and 228 of the stabilizing member 200. Although one end portion of the member 200 is supported on the rod 224 and the opposite end is slidable with respect to the pin 222 the member 200 is suspendable by the cables 234 and 244 that connect to the weight 240. In this manner the force of the rollers 226 and 228 against the tire 38 can be controlled.

The hydraulic pressure in the cylinder 370 rises to extrusion level, i.e., sufficient to cause discharge of the sealant 296 from the applicator head 272. This extrusion pressure can be reached prior to engagement of the applicator head 274 with the tire 38. The tire then begins its rotation by the belt 111 at a predetermined constant speed in the direction indicated in FIG. 8, said rotation being governed by the motor 100 the belt 102 and the pulley 104.

As the tire rotates the sealant 296 is simultaneously discharged from the opening in the applicator head 274 defined between the lips 354 and 356. The discharge of the sealant 296 is at a constant fixed rate corresponding to the speed of rotation of the tire 38 due to a constant predetermined fixed rate of movement of the piston 380 in the cartridge 294. The layer of sealant 296 on the tire liner has feathered edge portions corresponding to the tapered end portions 355 and 257 of the lip 354. Thus the coating of sealant 296 on the tire liner 358 is of a constant predetermined cross section as the tire 38 is rotated past the applicator head 274.

When the tire 38 completes one full revolution past the applicator head 274 the extrusion pressue level in the cylinder 370 can be dropped and the elevator member 42 lowered to form a butt joint of the sealant coating as shown in FIG. 9.

Figure 15:
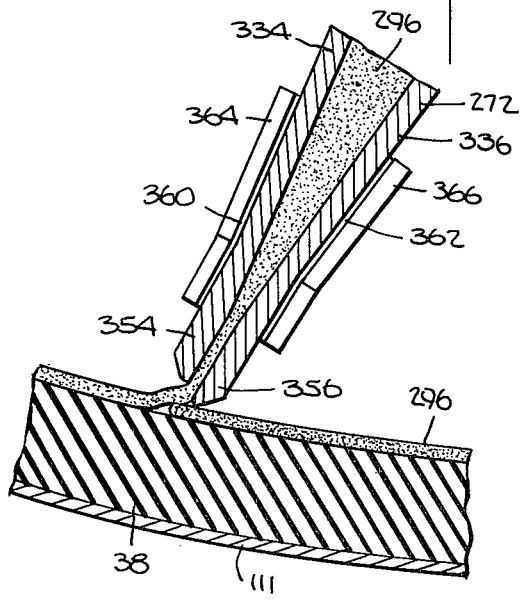
FIG. 15 is an enlarged fragmentary front view of the sealant applicator and tire in a position that corresponds to the second operating position of the drop off mechanism.
Figure 16:
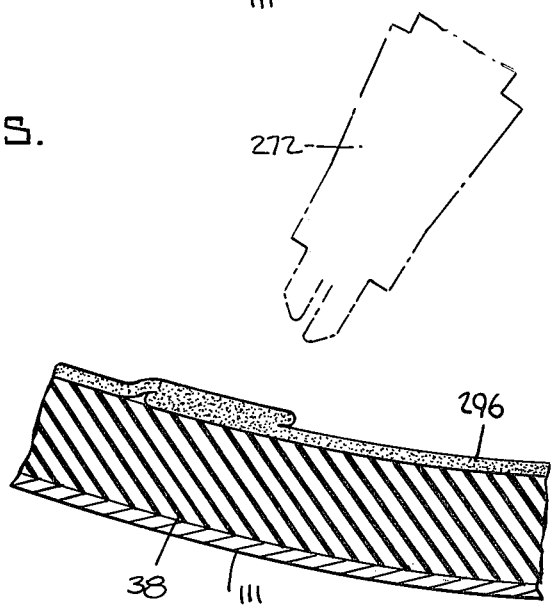
FIG. 16 is an enlarged fragmentary front view of a tire with the end portions of the sealant coating in an overlap splice arrangement, the sealant applicator being shown in dotted lines.

Preferably the sealant discharge is continued for a small distance beyond one full revolution to form an overlapping splice of the sealant coating as shown in FIGS. 15 and 16.

To accomplish an overlap splice the cylinder 130 (FIG. 10) is vented, as the tire 38 completes one revolution, to enable the compressed spring 158 to protract the rod 138. The link 172 is then moved counterclockwise as viewed in FIG. 10 urging the rod 174 in a downward direction. Since the collar 148 is free to move with respect to the pin 160 the entire elevator member is dropped-off or lowered by the amount indicated by the dotted line in FIG. 13. The stop screw 170 engageable with the bracket 134 limits the drop-off to a predetermined amount. The rod 174 transfers this drop-off motion to the bracket 180. Although not shown the bracket 180 is fastened to the cross plate 46 in the same manner as the bracket 134 is fastened to the cross plate 44.

The drop-off amount is predetermined to substantially equal the thickness of the coating 296 on the tire liner 358. Thus the lip 356 does not unduly interfere with the base coating of the sealant 296 when the applicator head 272 discharges the overlap splice portion as shown in FIG. 16. The overlap splice can be made to a desired predetermined length by lowering the pressure of the cylinder 370 below extrusion level when the desired length of overlap is achieved. The elevator member 42 is also lowered by actuating the cylinder 131 to protract the actuator rod 122.

After a butt joint or overlap splice is made the joint or splice is stitched in any suitable known manner such as by using a known stitching tool with zinc stearate powder. Such stitching prevents the sealant 296 from creeping back over itself in the overlap splice or separating at the butt joint.

One advantage, among others, of the overlap splice is its balancing effect on the tire when applied at the light point.

After the tire 38 has been coated the elevator member 42 is lowered by the cylinder 131, the piston 380 is retracted slightly by the cylinder 370 to lower the sealant pressure below extrusion level, the bead spreader device 105 is moved to its inactive position, the carriage 24 is moved away from the frame 22 and the tire 38 is interchanged with an uncoated tire for a repeat of the sealant application process.

As a matter of choice the applicator head 272 can be inclined with respect to the tire liner 358 as shown, for example, in FIGS. 7 and 8 or the applicator head can be placed in a normal position with respect to the tire liner 358 as shown, for example, in FIG. 17.

Figure 22:
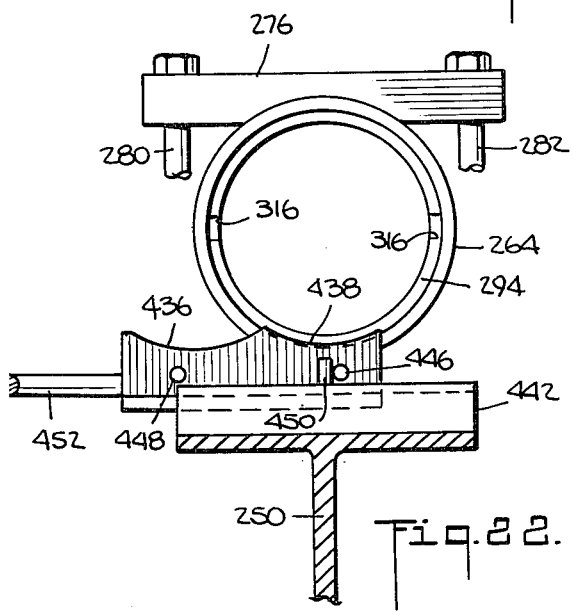
FIGS. 22 and 23 are rearward end views of the sealant tank.
Figure 23:
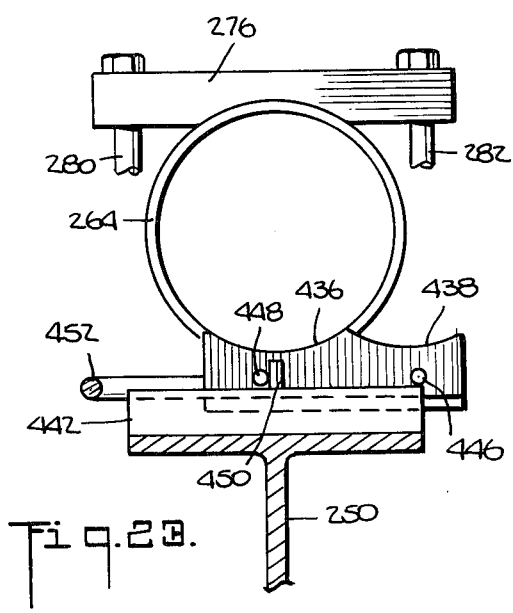

When the sealant cartridge 294 is exhausted of its sealant supply the piston 380 is retracted out from the rearward end of the cartridge as shown in FIG. 5. During such piston retraction, the support member 432 is positioned with the curved portion 438 at the rearward end of the cartridge 294 as shown in FIG. 22. The curved portion 438 interferes with retraction of the cartridge 294 from the housing 264 but does not interfere with retraction of the piston 380.

With the piston 380 fully retracted from the cartridge 294, the latch 406 is pivoted away from its engaged position with the plate 272. Although not shown the pivoting of the latch 406 activates a safety switch preventing any buildup of pressure in the cylinder 370. The cylinder 402 retracts the actuator rod 400 to pivot the entire mounting plate and cylinder 370 from the position of FIG. 19 to the position of FIG. 20.

The cradle member 420 is pivoted onto the plate 378 and the support member 432 is shifted to a second position, governed by engagement of the pin 448 with the pin 450. The curved portion 436 is thus presented rearwardly of the housing 264, and does not interfere with retraction of the cartridge from said housing. Rather, the curved portions 436 and 430 form a support for the cartridge 294 as it is removed from the housing 264 by any suitable known pulling device engageable with the bayonet slots 316.

A sealed replacement cartridge is preheated to approximately 240° F. This replacement cartridge is inserted in the housing 264 without a seal (not shown) in the front nose cap 303 and without the rear cartridge cap 312 which are removed in any suitable known manner. The replacement cartridge 294 is installed in the housing 264 by sliding the main body portion 298 on the curved surfaces 430 and 436, that guide the cartridge 294 into the rearward end of the housing 264. The housing 264 is thus loaded in breech fashion.

The support member 432 is shifted to a position wherein the pins 446 and 450 engage and locate the curved portion 438 rearward of the housing 264 to prevent removal of the newly installed cartridge 294, yet permit entry of the piston 380 into the cartridge. The cradle member 420 is pivoted to the position shown in FIG. 19 and the cylinder 402 protracts the actuator rod 400 to pivot the plate 372 and the cylinder 370 from the position shown in FIG. 20 to the position of FIG. 19. The latch member 406 is engaged with the plate 372 and in its engaged position, deactivates the safety cutoff switch (not shown) to permit a pressure buildup in the hydraulic cylinder 370 and protraction of the piston 380 into the cartridge 294.

It is desirable to maintain the sealant 296 in the apparatus 20 at a temperature of approximately 240° F. Any suitable known external surface heaters on the housing 264 such as the heater 324 can be used along with conventional temperature controllers and/or temperature indicating devices. Similarly, suitable known external surface heaters can be installed on the delivery pipe 266 and the applicator head 272 such as the heaters 360 and 362 on the die members 334 and 336.

A tire was coated with sealant in accordance with the following data:

| Tire Size | HR78-15 |
| --- | --- |
| Amount of Sealant | 2 lbs. 10 oz. |
| Sealant Coating | 0.11 in thick |
| Tire Rotation | 50scc/rev. = 1.2 rpm |
| Extrusion Rate | 3.15 lbs/min. |
| Extrusion Pressure | 600 psig. |

Cure 24 hours at room temperature after sealant application.

The sealant applicator head 272 is detachable from the delivery pipe 266 upon loosening the screw 352 to remove the coupling member 274 and permit interchange of the applicator head 272 with other sealant applicator heads (not shown) having different tire engaging profiles for engaging the liners of different size tires. Some advantages of the present invention evident from the foregoing description include an apparatus and method for consistently providing a predetermined profile of sealant to tires of the same size. As will be apparent to those skilled in the art, suitable modifications can be made with respect to the applicator head, the rate of sealant discharge, the amount of tire bead spread and the tire rotation rate, for example, to permit a flexibility of operation in accomodating tires of different size.

In view of the above it will be seen that the several objects of the invention are achieved and other advantageous results attained. As various changes could be made in the above constructions and methods without departing from the scope of the invention, it is intended that all matter contained in the above description or shown in the accompanying drawings shall be interpreted as illustrative and not in a limiting sense.

What is claimed is:

1. An apparatus for applying tire puncture sealant material to the liner of a cured annularly shaped tire under the tread region thereof comprising, a frame, means on said frame for supporting and rotating an unmounted, uninflated tire, bead spreader means movable with respect to said frame for engaging oppositely disposed bead portions of said tire and spreading apart said bead portions a predetermined amount while said tire is supported and being rotated on said frame thereby furnishing the liner of said tire with a predetermined cross-sectional profile, in the area of the spread beads, sealant applicator means for conducting said sealant material in a fluid state to the liner of said tire, said sealant applicator means being movable with respect to said frame and including a first applicator head engageable with the liner of said tire in the area of the spread beads, said first applicator head substantially spanning the width of the tire liner under said tread and having a tire engaging profile substantially corresponding to the predetermined profile of said tire liner in the area of the spread beads, said first applicator head further including an elongated opening extending substantially across the width of the tire liner in the area of the spread beads, and means associated with the sealant applicator means for causing movement of said sealant material through said first applicator head for discharge from said elongated opening at a predetermined rate to permit deposition of the fluid sealant material on said tire liner in the area of the spread beads in a layer of predetermined cross-section extending across the width of the tire liner under said tread while said tire is rotating, whereby the inner circumference of said tire liner under said tread is substantially coated with the layer of sealant when said tire has rotated past said elongated opening.

2. The apparatus of claim 1 wherein said first applicator head includes first and second lip portions spaced apart a first distance, one of said lip portions being formed with said tire engaging profile for engagement with said liner said one of said lip portions protruding beyond the other said lip portion a predetermined amount to permit establishment of a predetermined second spacing between the liner and the other said lip portion when said one lip portion is engaged with said liner, whereby the first distance spacing between said lip portions and the protrusion of said one lip portion beyond said other lip portion defines the elongated opening in said first applicator head through which the sealant material is discharged when said first applicator head is engaged with said tire liner.

3. The apparatus of claim 2 wherein the profile of said tire liner in the area of spread beads is of predetermined curvature and the tire engaging profile is said one of said lip portions has a curvature substantially corresponding to the predetermined curvature of said tire liner in the area of the spread beads to permit substantially continuous contact between said one of said lip portions and said tire liner in the area of the spread beads when said first applicator head engages said tire liner.

4. The apparatus of claim 3 wherein said first applicator head is releasable from said sealant applicator means for interchange with a second applicator head having a different curved profile from that of said first applicator head.

5. The apparatus of claim 1 wherein said sealant applicator means include at least one peripheral surface heater member for maintaining the sealant material at a predetermined temperature range as it passes through said sealant applicator means.

6. The apparatus of claim 1 wherein said sealant applicator means is movable in a first direction from a location remote from said tire toward the supporting and rotating means on said frame to position said first applicator head within the tire annulus directly over said tire liner in the area of the spread beads after said tire is disposed on the supporting and rotating means and prior to the application of the sealant material on the tire liner, said sealant applicator means being movable away from the supporting and rotating means in a direction oppposite said first direction to position said first applicator head in said remote location after the sealant material has been applied to the tire liner.

7. The apparatus of claim 6 further including means for causing relative movement between the supporting and rotating means on said frame and the sealant applicator means in a second direction substantially parallel to the equatorial plane of the tire to bring the first applicator head and the tire liner into engagement in the area of the spread beads when said sealant material is to be applied to the tire liner, said relative movement means also causing said relative movement in a direction opposite said second direction to separate said first applicator head from said tire liner after the sealant material has been applied to the tire liner.

8. The apparatus of claim 7 wherein said relative movement means are incorporated on said frame in association with said supporting and rotating means to raise and lower said tire with respect to said first applicator head when said first applicator head is positioned directly over said tire liner in the area of the spread beads.

9. The apparatus of claim 1 wherein said frame comprises a pair of spaced and oppositely disposed upright members, said support means comprising an elevator member extending across said upright members, and means for moving said elevator member from a first nonengaging position between said tire liner and said first applicator head, to a second position wherein said tire liner and said first applicator head are engaged.

10. The apparatus of claim 9 wherein a first pair of spaced rollers are pivoted to said elevator member to support said tire at a lower portion of its outer tread periphery.

11. The apparatus of claim 10 further including means for rotatably driving one of said first pair of rollers at a first predetermined rotational speed and an endless belt disposed around said first pair of spaced rollers to engage and support said tire at the lower portion of its outer tread periphery the engagement of said belt with said tire causing said tire to rotate at a second predetermined rotational speed proportional to the first predetermined rotational speed of said one of said rollers when said one of said rollers is being rotated.

12. The apparatus of claim 10 further including a tire stabilizing member disposed over said elevator member for engaging an upper portion of the outer trend periphery when said tire is in a substantial vertical orientation to maintain said tire in said substantial vertical orientation when said tire is being rotated by said supporting and rotating means.

13. The apparatus of claim 12 wherein said tire stabilizing member has at least one end supported on one of the upright members of said frame and wherein a second pair of spaced rollers are pivoted to said stabilizing member for rolling engagement with the upper portion of the outer tread periphery during rotation of said tire by said supporting and rotating means.

14. The apparatus of claim 9 further including drop off means on said upright members and said elevator member for lowering said elevator member a predetermined distance in a direction opposite said second direction to a drop off position intermediate the first nonengaging position and the second engaging position of said tire liner and said first applicator head.

15. The apparatus of claim 14 wherein said elevator means comprises a crossplate having opposite end portions at respective said upright members, said drop off means comprising a drop off mechanism at each end portion of said crossplate, one of said drop-off mechanisms including a fixed stop surface on one of said upright members, a collar integrally connected to said crossplate, said collar having a pin slidably disposed therein and means for slidably moving said collar said predetermined distance in said direction opposite said first direction to cause corresponding movement of said crossplate to said drop off position.

16. The apparatus of claim 1 wherein said bead spreader means are pivotally secured to said supporting and rotating means.

17. The apparatus of claim 1 wherein said bead spreader means are disposed at opposite sides of said first sealant applicator head when said first sealant applicator head is engaged with the liner of said tire, whereby a portion of the beads of said tire are spread apart forward and rearward of said applicator head with respect to the direction of rotation of said tire.

18. The apparatus of claim 1 wherein said sealant applicator means include a sealant supply housing having forward and rearward end portions and said means for causing movement of said sealant material through said first applicator head includes a piston and means for moving said piston from the rearward to the forward end portion of said supply housing at a predetermined fixed rate of speed to force said sealant from said housing through said first applicator head at a predetermined fixed rate of discharge.

19. The apparatus of claim 18 wherein said sealant supply housing includes a removable cartridge filled with said sealant material and said piston is movable in said cartridge and retractable from said cartridge at the rearward end of said supply housing to permit interchange of an exhausted cartridge with a full cartridge of sealant.

20. The apparatus of claim 19 wherein said sealant supply housing and said piston and said means for moving said piston are substantially aligned, said piston upon retraction from said supply housing and said means for moving said piston being pivotable out of alignment with said supply housing to permit removal and interchange of said exhausted cartridge with said full cartridge through the rearward end portion of said supply housing.

21. A method of applying tire puncture sealant material to the liner of a cured tire comprising, orienting the tire with the equatorial plane in a substantially vertical position, spreading the beads of the tire a predetermined amount to furnish the tire with a predetermined profile in the area of the spread beads, rotating the tire at a predetermined speed, applying sealant material to the liner of the tire under the tread region while the tire is rotating, using an applicator having a cross-sectional profile corresponding to the predetermined cross-sectional profile of the tire in the area of the spread beads by engaging the applicator head with the tire liner and forcing sealant material out of the applicator at a predetermined fixed rate of discharge to provide a uniform layer of sealant.

22. The method of claim 21 including locating a light portion of the tire by balancing the tire before applying the sealant material thereto and starting the sealant application at the light portion and overlapping the sealant against itself at the end of one rotation of the tire to help compensate for the light portion of the tire.

* * * * *